US009986554B2

(12) United States Patent
Uchino et al.

(10) Patent No.: US 9,986,554 B2
(45) Date of Patent: May 29, 2018

(54) MOBILE COMMUNICATION SYSTEM AND RADIO BASE STATION

(71) Applicant: NTT DOCOMO, INC., Tokyo (JP)

(72) Inventors: Tooru Uchino, Tokyo (JP); Hideaki Takahashi, Tokyo (JP); Wuri Andarmawanti Hapsari, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 42 days.

(21) Appl. No.: 15/023,915

(22) PCT Filed: Sep. 19, 2014

(86) PCT No.: PCT/JP2014/074808
§ 371 (c)(1),
(2) Date: Mar. 22, 2016

(87) PCT Pub. No.: WO2015/046039
PCT Pub. Date: Apr. 2, 2015

(65) Prior Publication Data
US 2016/0219565 A1 Jul. 28, 2016

(30) Foreign Application Priority Data

Sep. 26, 2013 (JP) ................................. 2013-200354

(51) Int. Cl.
*H04W 72/04* (2009.01)
*H04W 76/02* (2009.01)
(Continued)

(52) U.S. Cl.
CPC ....... *H04W 72/044* (2013.01); *H04W 76/025* (2013.01); *H04W 88/16* (2013.01); *H04W 92/20* (2013.01)

(58) Field of Classification Search
CPC ............. H04W 76/025; H04W 72/044; H04W 36/023; H04W 76/04; H04W 84/18;
(Continued)

(56) References Cited

U.S. PATENT DOCUMENTS 5,822,361 A * 10/1998 Nakamura ........... H04B 1/7143
370/330
2009/0061876 A1 * 3/2009 Ho ........................ H04W 99/00
455/436
(Continued)

FOREIGN PATENT DOCUMENTS

| JP | 200078643 A | 3/2000 |
| WO | 2010/017467 A1 | 2/2010 |
| WO | 2011/155255 A1 | 12/2011 |

OTHER PUBLICATIONS

International Search Report issued in PCT/JP2014/074808 dated Dec. 16, 2014 (3 pages).
(Continued)

*Primary Examiner* — Ian N Moore
*Assistant Examiner* — Phong La
(74) *Attorney, Agent, or Firm* — Osha Liang LLP

(57) ABSTRACT

Embodiments disclosed herein at directed to appropriately conducting "Discard control" while "inter-eNB CA" is performed. In a mobile communication system of the invention, a radio base station (MeNB) is configured to transfer a PDCP-PDU transmitted by a gateway device (S-GW) to either a mobile station (UE) or a radio base station (SeNB). The radio base station (MeNB) is configured to start a given timer at the point when the PDCP-PDU is received from the gateway device (S-GW) while the "Inter-eNB CA" is performed. The radio base station (MeNB) is configured to, at the point when the given timer expires, give a notice on the expiration to the radio base station (SeNB). The radio base
(Continued)

station (SeNB) is configured to discard a PDCP-PDU transferred by the radio base station (MeNB) in response to the notice.

3 Claims, 11 Drawing Sheets

(51) Int. Cl.
 *H04W 88/16* (2009.01)
 *H04W 92/20* (2009.01)

(58) Field of Classification Search
 CPC ..... H04W 84/20; H04W 92/20; H04W 72/04; H04W 88/16; H04W 4/006; H04W 28/14
 See application file for complete search history.

(56) References Cited

U.S. PATENT DOCUMENTS

| | | | | |
|---|---|---|---|---|
| 2009/0109926 A1* | 4/2009 | Meylan | ............... | H04W 36/02 370/331 |
| 2012/0226838 A1* | 9/2012 | Visalli | ............... | G06F 11/3656 710/110 |
| 2013/0010716 A1* | 1/2013 | Dinan | ............... | H04W 76/025 370/329 |
| 2013/0064158 A1* | 3/2013 | Sundell | ............... | H04W 76/02 370/311 |
| 2013/0070682 A1 | 3/2013 | Kim et al. | | |
| 2014/0016614 A1* | 1/2014 | Velev | ............... | H04W 4/005 370/331 |
| 2014/0301188 A1* | 10/2014 | Koskinen | ............... | H04L 47/32 370/230 |
| 2015/0055621 A1* | 2/2015 | Koskinen | ............... | H04W 36/18 370/331 |
| 2015/0215987 A1* | 7/2015 | Kim | ............... | H04W 76/04 370/329 |
| 2016/0021581 A1* | 1/2016 | Deenoo | ............... | H04W 36/0055 370/331 |
| 2016/0066362 A1* | 3/2016 | Ohta | ............... | H04W 16/32 370/331 |
| 2016/0352643 A1* | 12/2016 | Xiao | ............... | H04L 47/28 |

OTHER PUBLICATIONS

Written Opinion of the International Searching Authority issued in PCT/JP2014/074808 dated Dec. 16, 2014 (4 pages).
Huawei, HiSilicon; "Throughput results for inter-frequency deployment of small cells"; 3GPP TSG-RAN WG2 Meeting #82, R2-131782; Fukuoka, Japan; May 20-24, 2013 (5 pages).
Office Action issued in the counterpart Japanese Patent Application No. 2013-200354, dated Jul. 11, 2017 (6 pages).
InterDigital Communications; "User Plane Architecture for Dual-Connectivity"; 3GPP TSG-RAN WG2 #82, R2-131939; Fukuoka, Japan, May 20-24, 2013 (8 pages).
BlackBerry UK Limited; "Further Discussion on U-Plane Protocol Architecture Designs"; 3GPP TSG RAN WG2 Meeting #83, R2-132442; Barcelona, Spain, Aug. 19-23, 2013 (7 pages).

* cited by examiner

MOBILE COMMUNICATION SYSTEM AND RADIO BASE STATION

TECHNICAL FIELD

The present invention relates to a mobile communication system and a radio base station.

BACKGROUND ART

With CA (Carrier Aggregation) stipulated in LTE (Long Term Evolution) Release-10, it is possible to realize high throughput by performing simultaneous communication while using a CC (Component Carrier) #1 and a CC #2 under the same radio base station eNB as shown in FIG. 12(a).

Meanwhile, "inter-eNB CA (or Inter-node UP aggregation)" is being studied in LTE Release-12, which is intended to realize high throughput by expanding the CA according to LTE Release-10 such that simultaneous communication can be performed by using a CC #1 and a CC #2 under different radio base stations eNB#1 and eNB#2 as shown in FIG. 12(b) (see Non-patent document 1).

If a single radio base station eNB cannot house all the CCs used by one UE, for example, it is necessary to perform the above-mentioned "Inter-eNB CA" in order to realize the throughput comparable to that of LTE Release-10. Here, a possible case is illustrated in FIG. 13 where a radio base station MeNB serves as an anchor node and transfers a PDCP-SDU (Packet Convergence Control Protocol-Service Data Unit), which is transmitted by a gateway device S-GW, to any of a mobile station UE and a radio base station SeNB in order to perform the "Inter-eNB CA".

PRIOR ART DOCUMENT

Non-Patent Document

Non-patent document 1: 3GPP TDoc R2-131782

SUMMARY OF THE INVENTION

However, the existing LTE method has a problem that it is unclear how "Discard timer control" should be conducted while the above-mentioned "Inter-eNB CA" is performed.

The present invention has been made in view of the above-mentioned problem. An object of the present invention is to provide a mobile communication system and a radio base station, which are capable of appropriately conducting "Discard timer control" while "Inter-eNB CA" is performed.

A first feature of the present invention is a mobile communication system in which a mobile station is configured to be able to perform carrier aggregation while using a cell under a master radio base station and a cell under a slave radio base station. The master radio base station is configured to transfer a data signal transmitted by a gateway device to any of the mobile station and the slave radio base station, while the carrier aggregation is performed, the master radio base station is configured to start a given timer at a point when the data signal is received from the gateway device, while the carrier aggregation is performed, the master radio base station is configured to, at a point when the given timer expires, give a notice on the expiration to the slave radio base station, and the slave radio base station is configured to discard the data signal transferred by the master radio base station in response to the notice.

A second feature of the present invention is a mobile communication system in which a mobile station is configured to be able to perform carrier aggregation while using a cell under a master radio base station and a cell under a slave radio base station. The master radio base station is configured to transfer a data signal transmitted by a gateway device to any of the mobile station and the slave radio base station, while the carrier aggregation is performed, the master radio base station is configured to start a timer on the master radio base station side at a point when the data signal is received from the gateway device, while the carrier aggregation is performed, the master radio base station is configured to notify the slave radio base station of elapsed time of the timer on the master radio base station side in conjunction with the transfer of the data signal, the slave radio base station is configured to, at a point when the data signal is received from the master radio base station, start a timer on the slave radio base station side with an initial value set to the elapsed time of the timer on the master radio base station side, and the slave radio base station is configured to discard the data signal transferred by the master radio base station at a point when the timer on the slave radio base station side expires.

A third feature of the present invention is a mobile communication system in which a mobile station is configured to be able to perform carrier aggregation while using a cell under a master radio base station and a cell under a slave radio base station. The master radio base station is configured to, while the carrier aggregation is performed, transfer a data signal transmitted by a gateway device to any of the mobile station and the slave radio base station, the slave radio base station is configured to start a given timer at a point when the data signal is received from the master radio base station, and the slave radio base station is configured to discard the data signal transferred by the master radio base station at a point when the given timer expires.

A fourth feature of the present invention is a radio base station capable of operating as a master radio base station in a mobile communication system, in which a mobile station is configured to be able to perform carrier aggregation while using a cell under the master radio base station and a cell under a slave radio base station, and the master radio base station is configured to transfer a data signal transmitted by a gateway device to any of the mobile station and the slave radio base station while the carrier aggregation is performed, the radio base station comprising: a timer management unit configured to start a given timer at a point when the data signal is received from the gateway device while the carrier aggregation is performed; and a transmission unit configured to, when the given timer expires, give a notice on the expiration to the slave radio base station.

A fifth feature of the present invention is a radio base station capable of operating as a master radio base station in a mobile communication system, in which a mobile station is configured to be able to perform carrier aggregation while using a cell under the master radio base station and a cell under a, slave radio base station, and the master radio base station is configured to transfer a data signal transmitted by a gateway device to any of the mobile station and the slave radio base station while the carrier aggregation is performed, the radio base station comprising: a timer management unit configured to start a timer on the master radio base station side at a point when the data signal is received from the gateway device while the carrier aggregation is performed; and a transmission unit configured to notify the slave radio base station of elapsed time of the timer on the master radio base station side in conjunction with the transfer of the data signal.

A sixth feature of the present invention is a radio base station capable of operating as a slave radio base station in a mobile communication system, in which a mobile station is configured to be able to perform carrier aggregation while using a cell under a master radio base station and a cell under the slave radio base station, and the master radio base station is configured to transfer a data signal transmitted by a gateway device to any of the mobile station and the slave radio base station while the carrier aggregation is performed, the radio base station comprising: a timer management unit configured to, at a point when the data signal is received from the master radio base station, start a timer on the slave radio base station side with an initial value set to elapsed time of a timer on the master radio base station side notified by the master radio base station; and a buffer management unit configured to discard the data signal transferred by the master radio base station at a point when the timer on the slave radio base station side expires.

DETAILED DESCRIPTION

Mobile Communication System According to First Embodiment of Present Invention

A mobile communication system according to a first embodiment of the present invention will be described with reference to FIG. 1 to FIG. 4. While an ITE mobile communication system will be described as an example of the mobile communication system of this embodiment, it is to be noted that the present invention is also applicable to mobile communication systems according to methods other than LTE.

Figure 1:
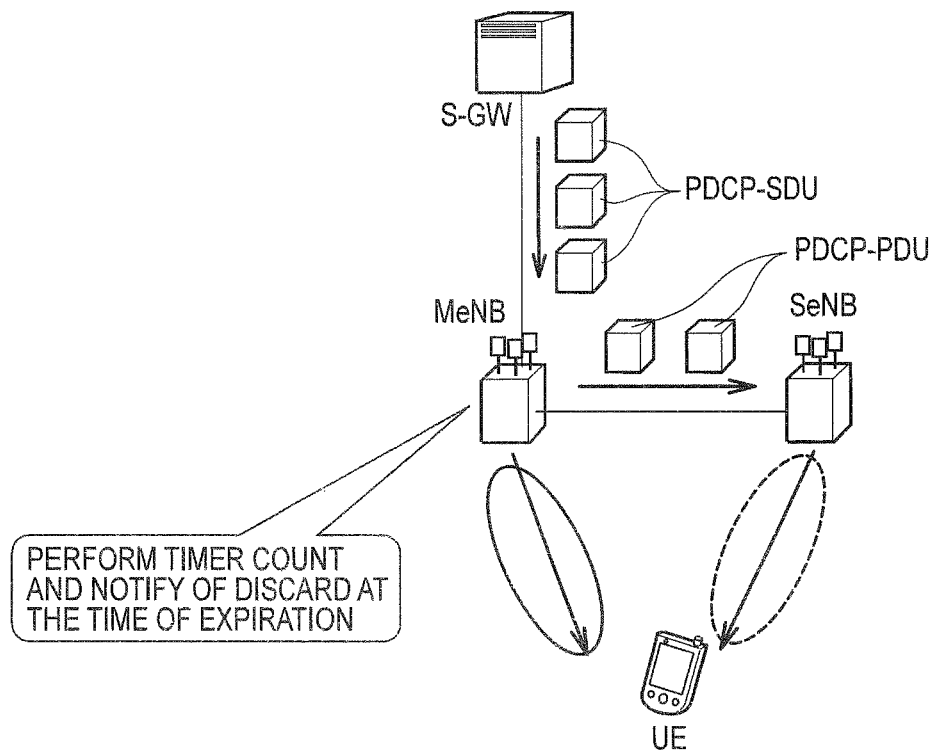
FIG. 1 is an overall configuration diagram of a mobile communication system according to a first embodiment of the present invention.

As shown in FIG. 1, the mobile communication system of this embodiment includes a gateway device S-GW, a radio base station MeNB, and a radio base station SeNB.

In the mobile communication system of this embodiment, the radio base station MeNB is assumed to be a master radio base station (or a macro radio base station which manages a macro cell) while the radio base station SeNB is assumed to be a slave radio base station (or a small radio base station which manages a small cell).

Meanwhile, in the mobile communication system of this embodiment, a mobile station UE is configured to be able to perform "Inter-eNB CA" while using a cell under the radio base station MeNB and a cell under the radio base station SeNB.

Moreover, as shown in FIG. 1, the mobile communication system of this embodiment is configured such that a PDCP-SDU transmitted by the gateway device S-GW is transferred by the radio base station MeNB, which is an anchor node, to the mobile station UE or the radio base station SeNB.

Figure 2:
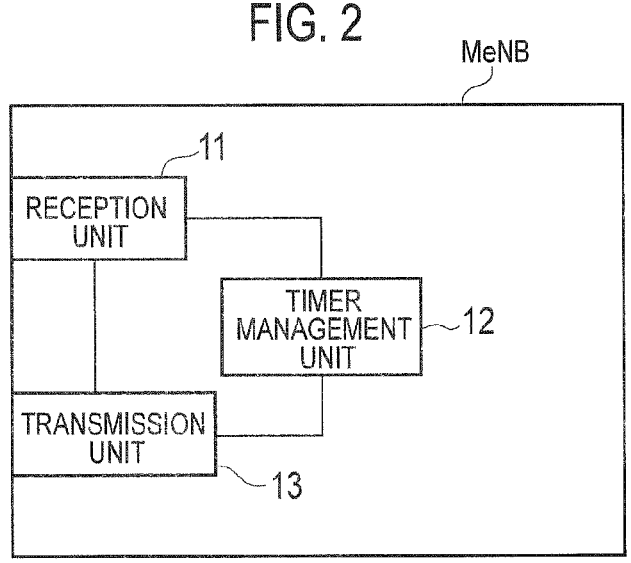
FIG. 2 is a functional block diagram of a radio base station MeNB according to the first embodiment of the present invention.

As shown in FIG. 2, the radio base station MeNB of this embodiment includes a reception unit 11, a timer management unit 12, and a transmission unit 13.

The reception unit 11 is configured to receive various signals from the gateway device S-GW, the radio base station SeNB, and the mobile station UE. The timer management unit 12 is configured to manage a given timer (a "Discard timer"). The transmission unit 13 is configured to transmit various signals to the gateway device S-GW, the radio base station SeNB, and the mobile station UE.

For example, the transmission unit 13 is configured to transmit a PDCP-PDU addressed to the mobile station UE, which is transmitted by the gateway device S-GW and received by the reception unit 11, to the mobile station UE or the radio base station SeNB.

Meanwhile, the timer management unit 12 is configured to start the given timer at the point of reception of the PDCP-SDU from the gateway device S-GW while the above-mentioned "Inter-eNB CA" is being performed.

Here, the timer management unit 12 is configured to stop the given timer when the timer management unit 12 confirms completion of transmission of the PDCP-PDU to the mobile station UE.

For example, the timer management unit 12 may be configured to stop the given timer when the reception unit 11 receives from the radio base station SeNB either a notice indicating that the PDCP-PDU is mapped in a transport block (or that transmission thereof to an RLC layer is started) or a notice indicating that the transmission of the PDCP-PDU is completed.

Here, the transmission unit 13 is configured to give a notice on the expiration to the radio base station SeNB at the point when the above-mentioned given timer expires without being stopped.

Operations of the mobile communication system of this embodiment will be described below with reference to FIG. 3 and FIG. 4.

First, an operation in the mobile communication system of this embodiment to be performed when a PDCP-SDU addressed to the mobile station UE is transmitted from the gateway device S-GW to the radio base station MeNB will be described with reference to FIG. 3.

Figure 3:
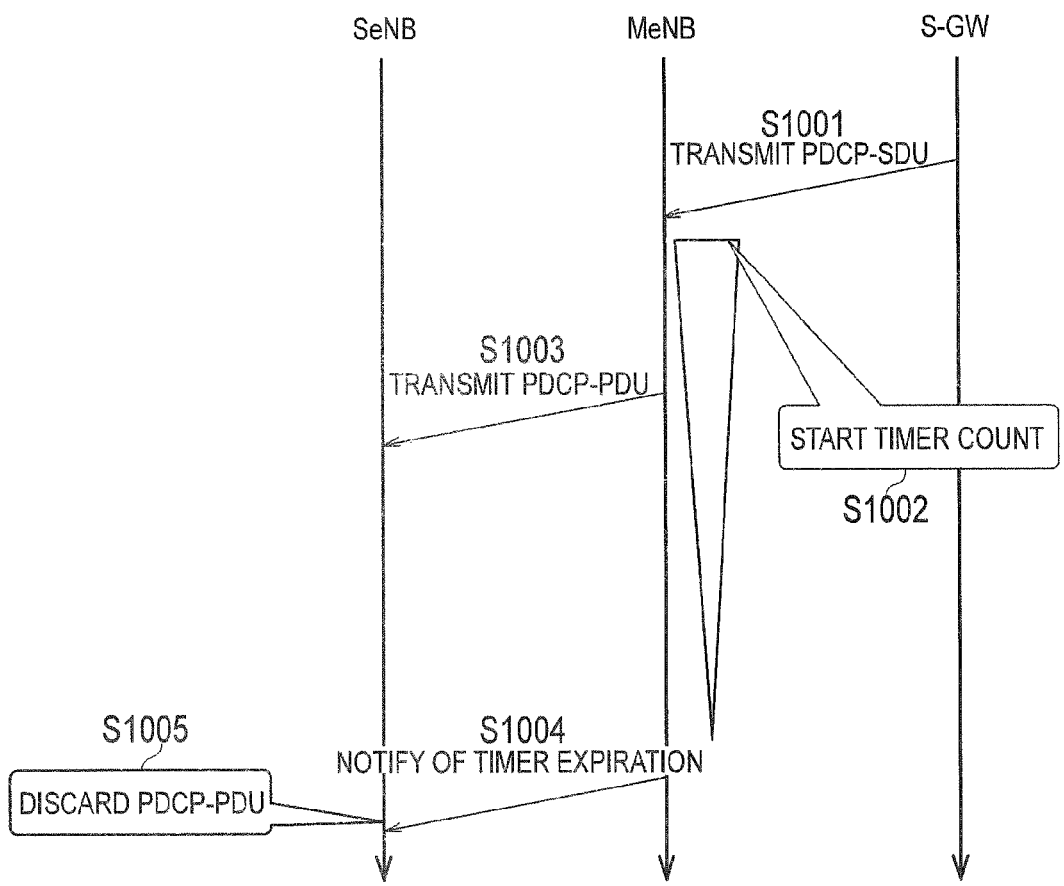
FIG. 3 is a sequence diagram showing an operation of the mobile communication system according to the first embodiment of the present invention.

As shown in FIG. 3, when the radio base station MeNB receives the PDCP-SDU addressed to the mobile station UE from the gateway device S-GW via an S1 interface in step S1001, the radio base station MeNB starts the given timer in step S1002, and transmits the PDCP-PDU addressed to the mobile station UE to the radio base station SeNB in step S1003.

In step S1004, the radio base station MeNB detects that the above-mentioned given timer expires without being stopped, and gives a notice on the expiration (or on discard of the PDCP-PDU) to the radio base station SeNB.

In step S1005, the radio base station SeNB discards the above-mentioned PDCP-PDU in response to the notice.

Here, the radio base station SeNB discards the above-mentioned PDCP-PDU when the radio base station SeNB receives the notice and the PDCP-PDU still remains in a buffer (a transmission buffer or a reception buffer).

Alternatively, the radio base station SeNB may discard the above-mentioned PDCP-PDU even when the radio base station SeNB receives the notice and the PDCP-PDU has already been mapped in the transport block (or the transmission to the RLC layer has been started).

Second, an operation in the mobile communication system of this embodiment to be performed by the radio base station MeNB when the PDCP-SDU addressed to the mobile station UE is transmitted from the gateway device S-GW to the radio base station MeNB will be described with reference to FIG. 4.

Figure 4:
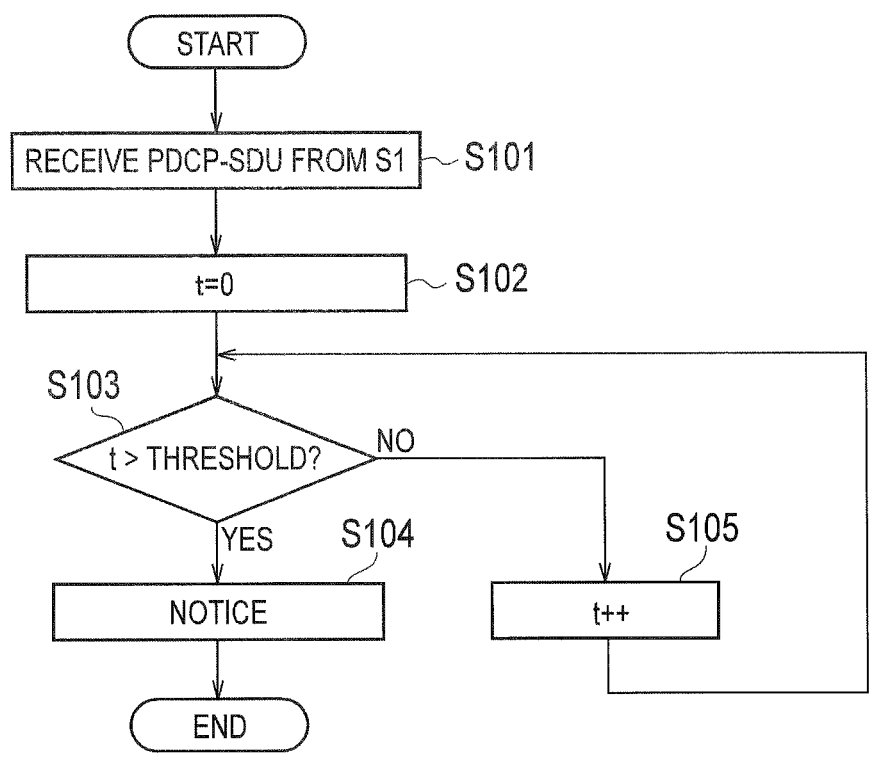
FIG. 4 is a flowchart showing an operation of the radio base station MeNB according to the first embodiment of the present invention.

As shown in FIG. 4, when the radio base station MeNB receives the PDCP-SDU addressed to the mobile station UE from the gateway device S-GW in step S101, the radio base station MeNB sets a value t of the given timer equal to "0" and starts the given timer in step S102.

Here, the radio base station MeNB sends the radio base station SeNB the PDCP-PDU addressed to the mobile station UE.

In step S103, the radio base station MeNB determines whether or not the value t of the given timer exceeds a threshold.

The operation proceeds to step S104 when the value t of the given timer is determined to exceed the threshold. The operation proceeds to step S105 when the value t of the given timer is determined not to exceed the threshold.

In step S104, the radio base station MeNB sends the radio base station SeNB a notice instructing to discard the above-mentioned PDCP-PDU addressed to the mobile station UE (or a notice indicating that the above-mentioned given timer expires without being stopped).

In the meantime, in step S105, the radio base station MeNB counts up the value t of the given timer by one.

Although a count-up timer is used as the given timer in the above description, it is also possible to use a count-down timer instead.

According to the mobile communication system of this embodiment, while the above-mentioned "Inter-eNB CA" is performed, it is possible to perform the "Discard timer control" on the basis of the point when the radio base station MeNB receives the PDCP-SDU from the gateway device S-GW, i.e., the point when the PDCP-SDU from the gateway device S-GW reaches a radio access network.

Mobile Communication System According to Second Embodiment of Present Invention

A mobile communication system according to a second embodiment of the present invention will be described with reference to FIG. 5 to FIG. 8 while focusing on different features from the mobile communication system according to the first embodiment of the present invention mentioned above.

Figure 5:
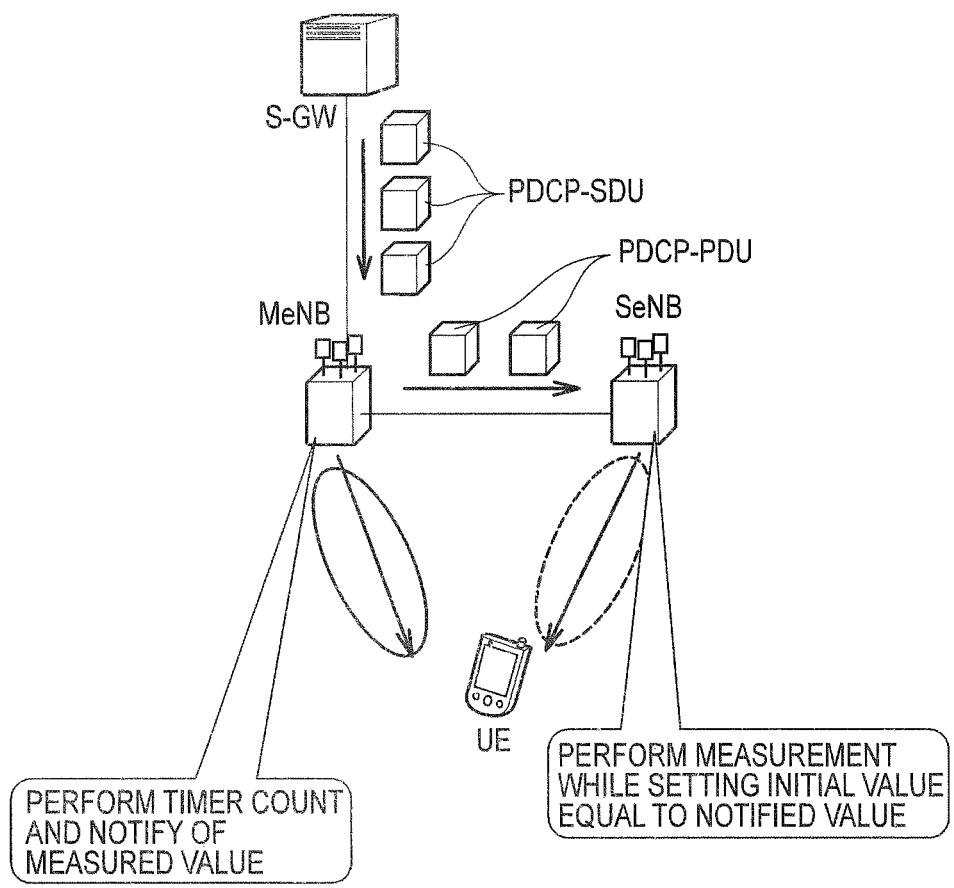
FIG. 5 is an overall configuration diagram of a mobile communication system according to a second embodiment or the present invention.

As shown in FIG. 5, in the mobile communication system of this embodiment, the timer management unit 12 of the radio base station MeNB is configured to start a timer on the radio base station MeNB side (a "Discard timer") at the point when the PDCP-SDU is received from the gateway device S-GW while the above-mentioned "Inter-eNB CA" is being performed.

Meanwhile, the transmission unit 13 of the radio base station MeNB is configured to notify the radio base station SeNB of elapsed time of the timer on the radio base station MeNB side (a measured value of the timer on the radio base station MeNB side) in conjunction with transfer of the PDCP-PDU addressed to the mobile station UE to the radio base station SeNB.

Figure 6:
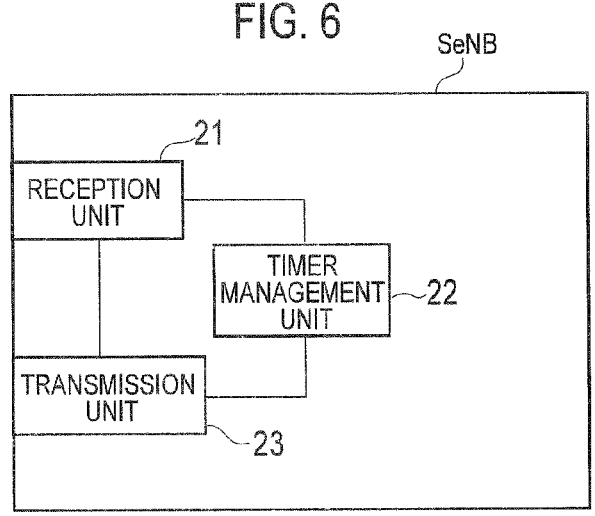
FIG. 6 is a functional block diagram of a radio base station SeNB according to the second embodiment of the present invention.

As shown in FIG. 6, the radio base station SeNB of this embodiment includes a reception unit 21, a timer management unit 22, and a transmission unit 23.

The reception unit 21 is configured to receive various signals from the gateway device S-GW, the radio base station MeNB, and a mobile station. The timer management unit 22 is configured to manage a timer on the radio base station SeNB side (a "Discard timer"). The transmission unit 23 is configured to transmit various signals to the gateway device S-GW, the radio base station MeNB, and the mobile station.

Here, the timer management unit 22 is configured to, at the point when the reception unit 21 receives the PDCP-PDU from the radio base station MeNB, start the timer on the radio base station SeNB side with an initial value set to the elapsed time of the timer on the radio base station MeNB side notified by the radio base station MeNB.

Meanwhile, the transmission unit 23 is configured to, at the point when the timer on the radio base station SeNB side expires, discard the PDCP-PDU transferred by the radio base station MeNB and remaining in the transmission buffer (or any of the PDCP-PDU which has already been mapped in the transport block but a relevant ACK is yet to be received, the PDCP-PDU which is in the process of transmission to the RLC layer but a relevant ACK is yet to be received, and the like).

Alternatively, the reception unit 21 is configured to, at the point when the timer on the radio base station SeNB side expires, discard the PDCP-PDU transferred by the radio base station MeNB and remaining in the reception buffer.

Operations of the mobile communication system of this embodiment will be described below with reference to FIG. 7 and FIG. 8.

First, an operation in the mobile communication system of this embodiment to be performed when the PDCP-SDU addressed to the mobile station UE is transmitted from the gateway device S-GW to the radio base station MeNB will be described with reference to FIG. 7.

Figure 7:
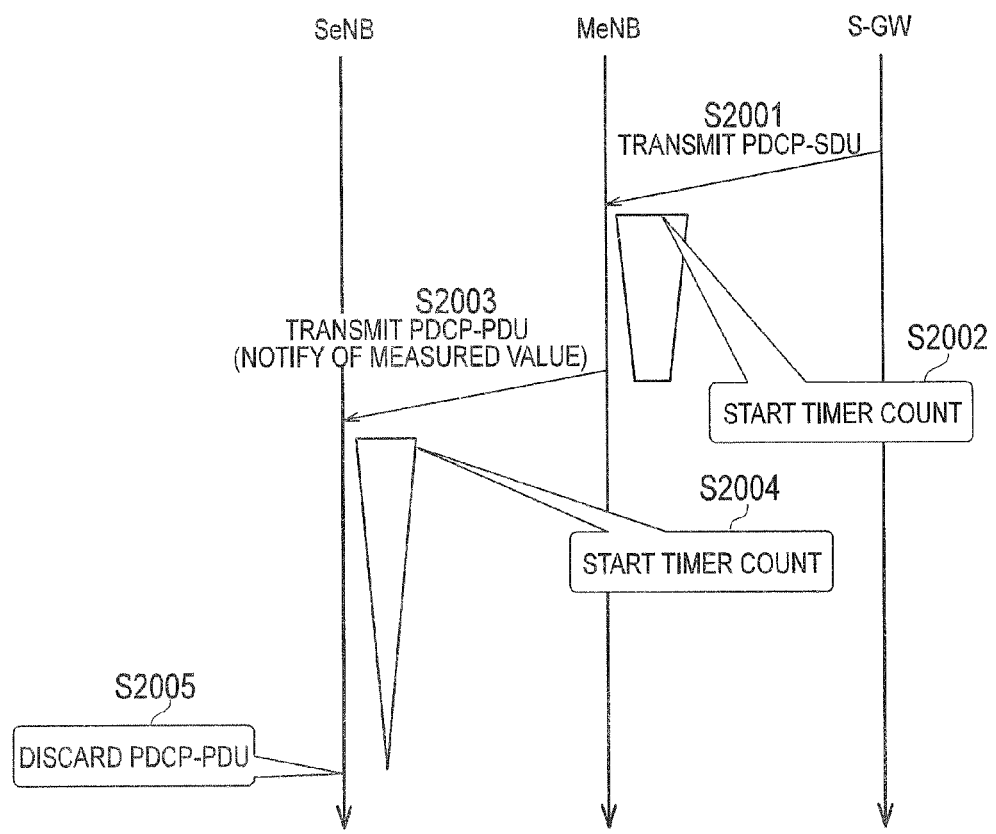
FIG. 7 is a sequence diagram showing an operation of the mobile communication system according to the second embodiment of the present invention.

As shown in FIG. 7, when the radio base station MeNB receives the PDCP-SDU addressed to the mobile station UE from the gateway device S-GW via the S1 interface in step S2001, the radio base station MeNB starts the timer on the radio base station MeNB side in step S2002. The radio base station MeNB transmits the PDCP-PDU addressed to the mobile station UE to the radio base station SeNB, and notifies the radio base station SeNB of the elapsed time of the timer on the radio base station MeNB side in step S2003.

Here, the radio base station MeNB may discard the PDCP-PDU when the timer on the radio base station MeNB side expires before the transmission of the PDCP-PDU addressed to the mobile station UE to the radio base station SeNB.

Meanwhile, the radio base station MeNB may adjust the above-mentioned elapsed time of the timer on the radio base station MeNB side in consideration of a transfer delay between the radio base station MeNB and the radio base station SeNB.

Here, the radio base station MeNB may measure the transfer delay by itself or may acquire the transfer delay from the radio base station SeNB.

In step S2004, the radio base station SeNB starts the timer on the radio base station SeNB side with the initial value set to the elapsed time of the timer on the radio base station MeNB side notified by the radio base station MeNB.

Here, the radio base station SeNB may set the initial value of the timer on the radio base station SeNB side in consideration of the transfer delay between the radio base station MeNB and the radio base station SeNB in addition to the elapsed time of the timer on the radio base station MeNB side.

Note that the radio base station SeNB may measure the transfer delay by itself or may acquire the transfer delay from the radio base station MeNB.

In step S2005, the radio base station SeNB discards the above-mentioned PDCP-PDU when the timer on the radio base station SeNB side expires without being stopped.

Here, the radio base station SeNB discards the above-mentioned PDCP-PDU when the timer on the radio base station SeNB side expires without being stopped and the PDCP-PDU still remains in the buffer (the transmission buffer or the reception buffer).

Alternatively, the radio base station SeNB may discard the above-mentioned PDCP-PDU even when the timer on the radio base station SeNB side expires without being stopped and the PDCP-PDU has already been mapped in the transport block (or the transmission to the RLC layer has been started).

Second, an operation in the mobile communication system of this embodiment to be performed by the radio base station SeNB when the PDCP-SDU addressed to the mobile station UE is transmitted from the gateway device S-GW to the radio base station MeNB will be described with reference to FIG. 8.

Figure 8:
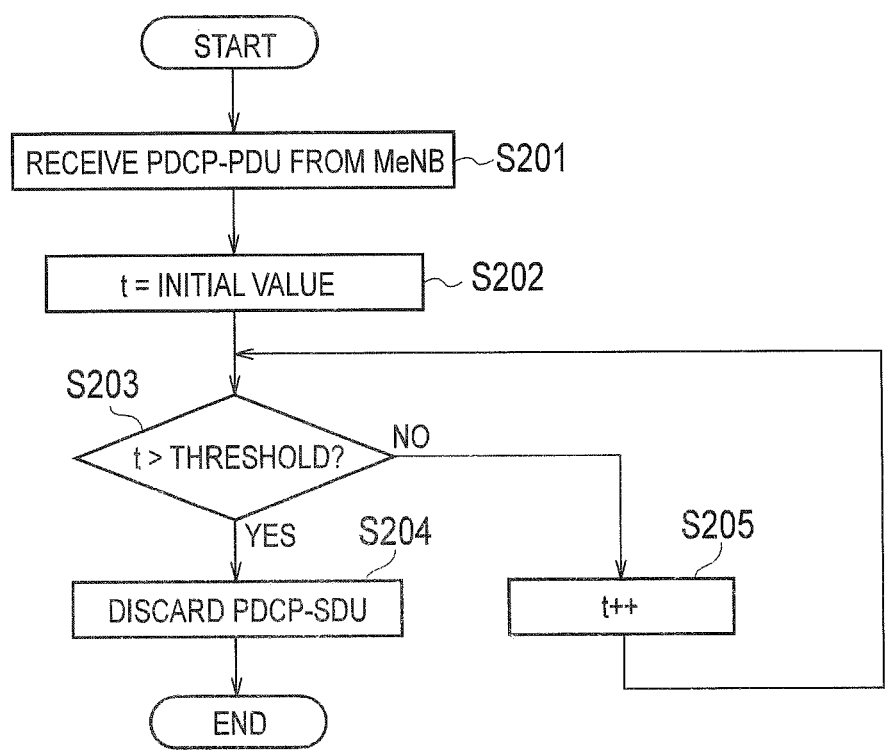
FIG. 8 is a flowchart showing an operation of the radio base station SeNB according to the second embodiment of the present invention.

As shown in FIG. 8, when the radio base station SeNB receives the PDCP-PDU addressed to the mobile station UE from the radio base station MeNB in step S201, the radio base station SeNB sets a value t of the timer on the radio base station SeNB side equal to the initial value (the elapsed time of the timer on the radio base station MeNB side notified by the radio base station MeNB) and starts the timer on the radio base station SeNB side in step S202.

In step S203, the radio base station SeNB determines whether or not the value t of the timer on the radio base station SeNB side exceeds a threshold.

The operation proceeds to step S204 when the value t of the timer on the radio base station SeNB side is determined to exceed the threshold. The operation proceeds to step S205 when the value t of the timer on the radio base station SeNB side is determined not to exceed the threshold.

In step S204, the radio base station SeNB discards the above-mentioned PDCP-PDU addressed to the mobile station UE.

In the meantime, in step S205, the radio base station SeNB counts up the value t of the timer on the radio base station SeNB side by one.

Although a count-up timer is used as the timer on the radio base station SeNB side in the above description, it is also possible to use a count-down timer instead. Meanwhile, a count-up timer may be used as the timer on the radio base station MeNB side or a count-down timer may be used as the timer on the radio base station MeNB side.

According to the mobile communication system of this embodiment, while the above-mentioned "Inter-eNB CA" is performed, it is possible to perform the "Discard timer control" on the basis of the point when the radio base station MeNB receives the PDCP-SDU from the gateway device S-GW, i.e., the point when the PDCP-SDU from the gateway device S-GW reaches the radio access network.

Mobile Communication System According to Third Embodiment of Present Invention

A mobile communication system according to a third embodiment of the present invention will be described with reference to FIG. 9 to FIG. 11 while focusing on different features from the mobile communication systems according to the first and second embodiments of the present invention mentioned above.

Figure 9:
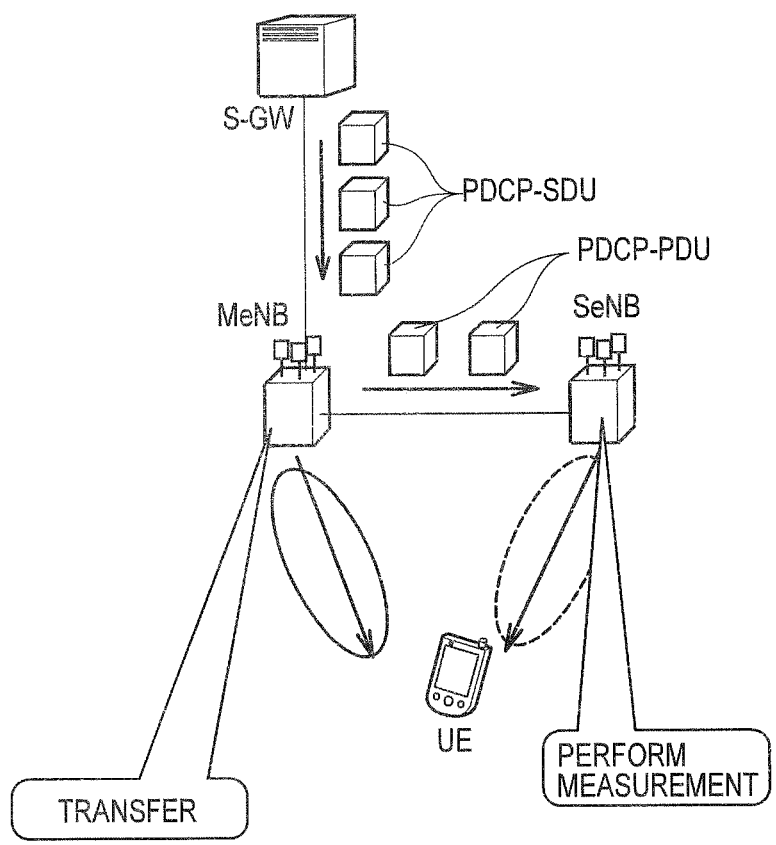
FIG. 9 is an overall configuration diagram of a mobile communication system according to a third embodiment or the present invention.

As shown in FIG. 9, in the mobile communication system of this embodiment, the timer management unit 22 of the radio base station SeNB is configured to start the given timer at the point when the PDCP-PDU is received from the radio base station MeNB while the above-mentioned "Inter-eNB CA" is performed.

Meanwhile, the reception unit 21 or the transmission unit 23 of the radio base station SeNB is configured to discard the PDCP-PDU transferred by the radio base station MeNB at the point when the given timer expires.

Operations of the mobile communication system of this embodiment will be described below with reference to FIG. 10 and FIG. 11.

First, an operation in the mobile communication system of this embodiment to be performed when the PDCP-SDU addressed to the mobile station UE is transmitted from the gateway device S-GW to the radio base station MeNB will be described with reference to FIG. 10.

Figure 10:
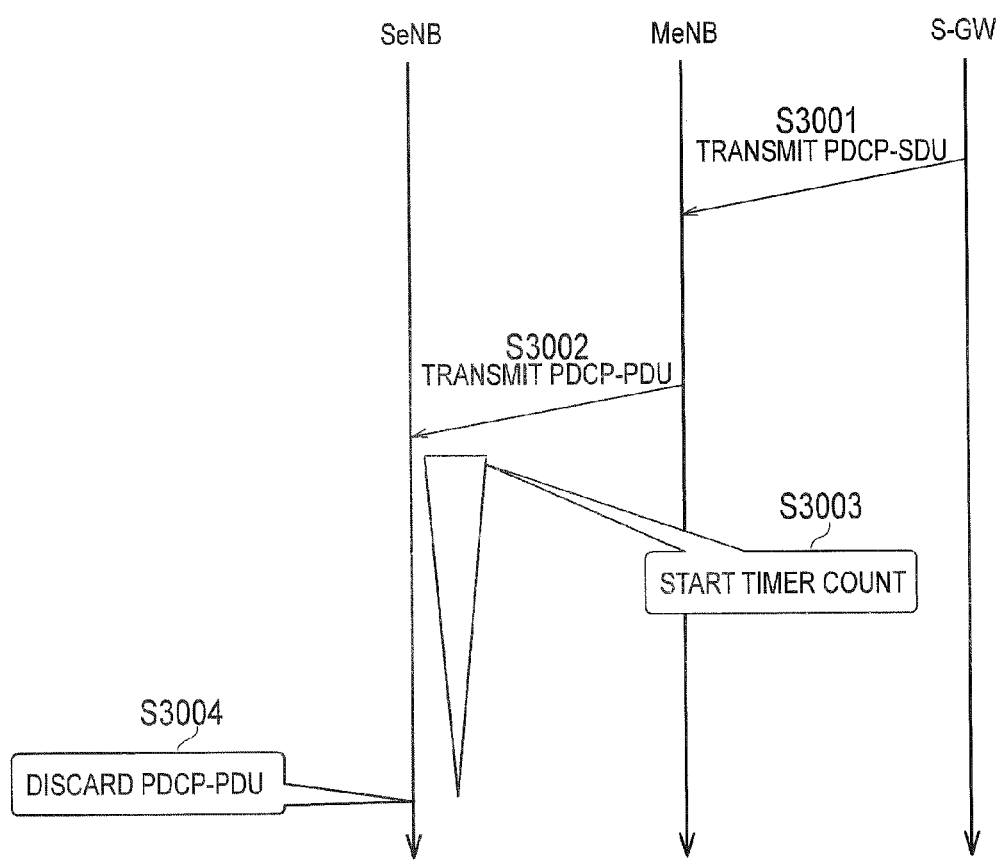
FIG. 10 is a sequence diagram showing an operation of the mobile communication system according to the third embodiment of the present invention.

As shown in FIG. 10, when the radio base station MeNB receives the PDCP-SDU addressed to the mobile station UE from the gateway device S-GW via the S1 interface in step S3001, the radio base station MeNB transmits the PDCP-PDU addressed to the mobile station UE to the radio base station SeNB in step S3002.

In step S3003, the radio base station SeNB starts the given timer at the point when the PDCP-PDU addressed to the mobile station UE is received from the radio base station MeNB.

In step S3004, the radio base station SeNB discards the above-mentioned PDCP-PDU when the given timer expires without being stopped.

Here, the radio base station SeNB discards the above-mentioned PDCP-PDU when the given timer expires without being stopped and the PDCP-PDU still remains in the buffer (the transmission buffer or the reception buffer).

Alternatively, the radio base station SeNB may discard the above-mentioned PDCP-PDU even when the given timer expires without being stopped and the PDCP-PDU has already been mapped in the transport block (or the transmission to the RLC layer has been started).

Second, an operation in the mobile communication system of this embodiment to be performed by the radio base station SeNB when the PDCP-SDU addressed to the mobile station UE is transmitted from the gateway device S-GW to the radio base station MeNB will be described with reference to FIG. 11.

Figure 11:
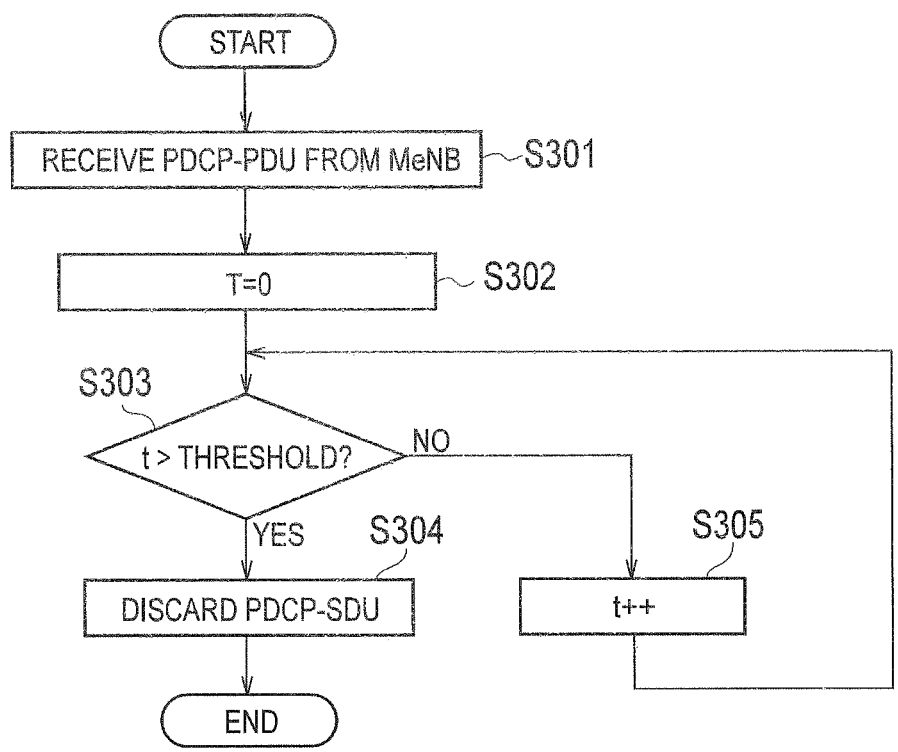
FIG. 11 is a flowchart showing an operation of a radio base station SeNB according to the third embodiment of the present invention.
Figure 12:
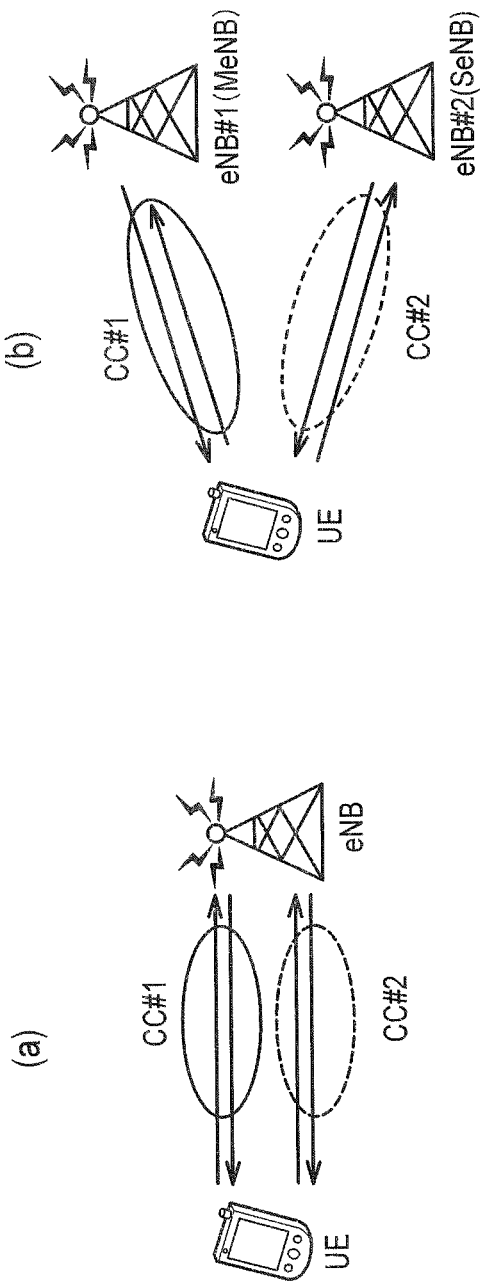
FIG. 12 illustrates diagrams for explaining carrier aggregation of the related art.
Figure 13:
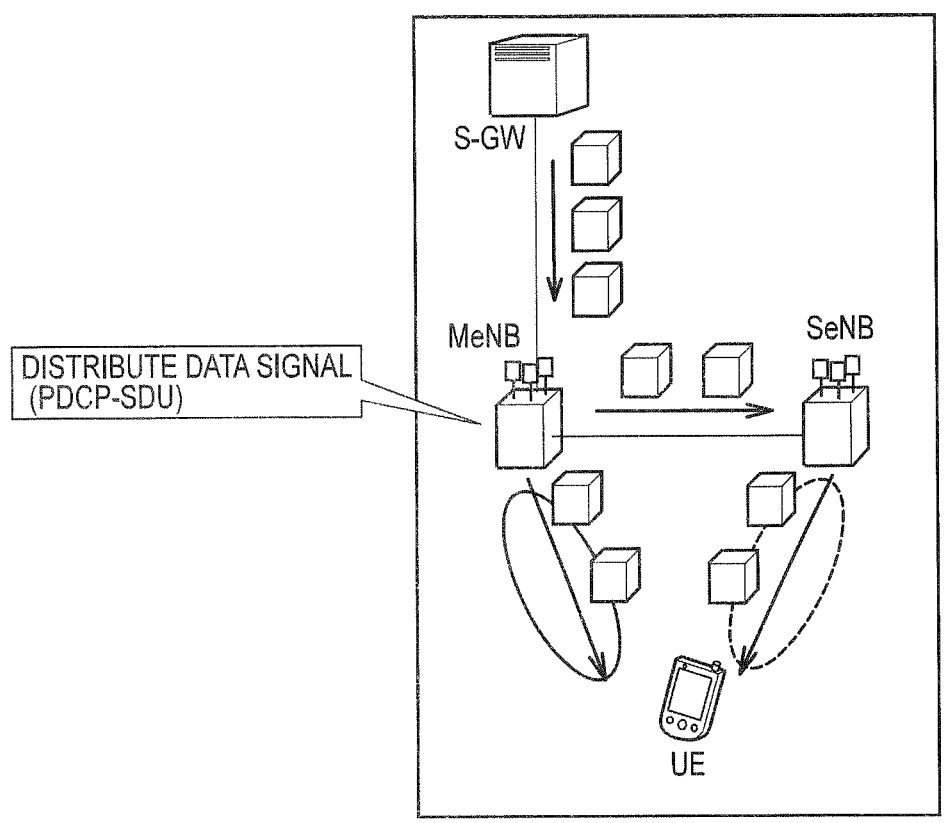
FIG. 13 is a diagram for explaining Inter-eNB CA of the related art.

As shown in FIG. 11, when the radio base station SeNB receives the PDCP-PDU addressed to the mobile station UE from the radio base station MeNB in step S301, the radio base station SeNB sets the value t of the given timer equal to "0" and starts the given timer in step S302.

In step S303, the radio base station SeNB determines whether or not the value t of the given timer exceeds a threshold.

The operation proceeds to step S304 when the value t of the given timer is determined to exceed the threshold. The operation proceeds to step S305 when the value t of the given timer is determined not to exceed the threshold.

In step S304, the radio base station SeNB discards the above-mentioned PDCP-PDU addressed to the mobile station UE.

In the meantime, in step S305, the radio base station SeNB counts up the value t of the given timer by one.

Although a count-up timer is used as the given timer in the above description, it is also possible to use a count-down timer instead.

According to the mobile communication system of this embodiment, while the above-mentioned "Inter-eNB CA" is performed, it is possible to perform the "Discard timer control" on the basis of the point when the radio base station SeNB receives the PDCP-PDU from the gateway device S-GW, i.e., the point when the PDCP-PDU from the gateway device S-GW reaches a node which will transmit the PDCP-PDU to the radio base station UE at the end.

The above-mentioned features of the embodiments may be described as follows.

The first feature of the present invention is a mobile communication system in which a mobile station UE is configured to be able to perform "Inter-eNB CA (carrier aggregation)" while using a cell under a radio base station MeNB (a master radio base station) and a cell under a radio base station SeNB (a slave radio base station). The radio base station MeNB is configured to transfer a PDCP-SDU (a data signal) transmitted by a gateway device S-GW to any of the mobile station US and the radio base station SeNB, while the "Inter-eNB CA" is performed, the radio base station MeNB is configured to start a given timer at a point when the PDCP-SDU is received from the gateway device S-GW, while the "Inter-eNB CA" is performed, the radio base station MeNB is configured to, at a point when the given timer expires, give a notice on the expiration to the radio base station SeNB, and the radio base station SeNB is configured to discard the PDCP-PDU transferred by the radio base station MeNB in response to the notice.

The second feature of the present invention is a mobile communication system in which a mobile station UE is configured to be able to perform "Inter-eNB CA" while using a cell under a radio base station MeNB and a cell under a radio base station SeNB. The radio base station MeNB is configured to transfer a PDCP-SDU transmitted by a gateway device S-GW to any of the mobile station UE and the radio base station SeNB, while the "Inter-eNB CA" is performed, the radio base station MeNB is configured to start a timer on the radio base station MeNB side at a point when the PDCP-SDU is received from the gateway device S-GW, while the "Inter-eNB CA" is performed, the radio base station MeNB is configured to notify the radio base station SeNB of elapsed time of the timer on the radio base station MeNB side in conjunction with the transfer of the PDCP-PDU, the radio base station SeNB is configured to, at a point when the PDCP-PDU is received from the radio base station MeNB, start a timer on the radio base station SeNB side with an initial value set to the elapsed time of the timer on the radio base station MeNB side, and the radio base station SeNB is configured to discard the PDCP-PDU transferred by the radio base station MeNB at a point when the timer on the radio base station SeNB side expires.

The third feature of the present invention is a mobile communication system in which a mobile station UE is configured to be able to perform "Inter-eNB CA" while using a cell under a radio base station MeNB and a cell under a radio base station SeNB. The radio base station MeNB is configured to, while the "Inter-eNB CA" is performed, transfer a PDCP-SDU transmitted by a gateway device S-GW to any of the mobile station UE and the radio base station SeNB, the radio base station SeNB is configured to start a given timer at a point when the PDCP-PDU is received from the radio base station MeNB, and the radio base station SeNB is configured to discard the PDCP-PDU transferred by the radio base station MeNB at a point when the given timer expires.

The fourth feature of the present invention is a radio base station eNB capable of operating as a radio base station MeNB in a mobile communication system, in which a mobile station UE is configured to be able to perform "Inter-eNB CA" while using a cell under the radio base station MeNB and a cell under a radio base station SeNB, and the radio base station MeNB is configured to transfer a PDCP-SDU transmitted by a gateway device S-GW to any of the mobile station UE and the radio base station SeNB while the "Inter-eNB CA" is performed, the radio base station eNB comprising: a timer management unit 12 configured to start a given timer at a point when the PDCP-SDU is received from the gateway device S-GW while the "Inter-eNB CA" is performed; and a transmission unit 13 configured to, when the given timer expires, give a notice on the expiration to the radio base station SeNB.

The fifth feature of the present invention is a radio base station eNB capable of operating as a radio base station MeNB in a mobile communication system, in which a mobile station UE is configured to be able to perform "Inter-eNB CA" while using a cell under the radio base station MeNB and a cell under a radio base station SeNB, and the radio base station MeNB is configured to transfer a PDCP-SDU transmitted by a gateway device S-GW to any of the mobile station UE and the radio base station SeNB while the "Inter-eNB CA" is performed, the radio base station eNB comprising: a timer management unit 12 configured to start a timer on the radio base station MeNB side at a point when the PDCP-SDU is received from the gateway device S-GW while the "Inter-eNB CA" is performed; and a transmission unit 13 configured to notify the radio base station SeNB of elapsed time of the timer on the radio base station MeNB side in conjunction with the transfer of the PDCP-PDU.

The sixth feature of the present invention is a radio base station eNB capable of operating as a radio base station SeNB in a mobile communication system, in which a mobile station UE is configured to be able to perform "Inter-eNB CA" while using a cell under a radio base station MeNB and a cell under the radio base station SeNB, and the radio base station MeNB is configured to transfer a PDCP-SDU transmitted by a gateway device S-GW to any of the mobile station UE and the radio base station SeNB while the "Inter-eNB CA" is performed, the radio base station eNB comprising: a timer management unit 22 configured to, at a point when the PDCP-PDU is received from the radio base station MeNB, start a timer on the radio base station SeNB side with an initial value set to elapsed time of a timer on the radio base station MeNB side notified by the radio base station MeNB; and a reception unit 21 or a transmission unit 23 configured to discard the PDCP-PDU transferred by the radio base station MeNB at a point when the timer on the radio base station SeNB side expires.

It should be noted that the foregoing operations of the radio base stations MeNB and SeNB may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the radio base stations MeNB and SeNB. Otherwise, the storage medium and the processor may be provided as discrete components inside the radio base station MeNB or SeNB. Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2013-200354 (filed on Sep. 26, 2013) is incorporated by reference in the present specification.

INDUSTRIAL APPLICABILITY

As described above, the present invention can provide a mobile communication system and a radio base station, which are capable of appropriately conducting "Discard timer control" while "Inter-eNB CA" is performed.

EXPLANATION OF THE REFERENCE NUMERALS

UE mobile station
MeNB/SeNB radio base station
11, 21 reception unit
12, 22 timer management unit
13, 23 transmission unit

The invention claimed is:
1. A mobile communication system comprising:
a master radio base station that controls a first cell;
a slave radio base station that controls a second cell; and
a mobile station that performs carrier aggregation using the first cell and the second cell, wherein:
the master radio base station transfers a downlink data signal transmitted by a gateway device to the slave radio base station, while the carrier aggregation is performed,
the master radio base station starts a timer on the master radio base station side at a point when the downlink data signal is received from the gateway device, while the carrier aggregation is performed,
the master radio base station notifies the slave radio base station of elapsed time of the timer on the master radio base station side in conjunction with the transfer of the downlink data signal,
the slave radio base station, at a point when the downlink data signal is received from the master radio base station, starts a timer on the slave radio base station side with an initial value set to the elapsed time of the timer on the master radio base station side,
the slave radio base station discards the downlink data signal transferred by the master radio base station at a point when the timer on the slave radio base station side expires,
the master radio base station adjusts the elapsed time of the timer on the master radio base station side in consideration of a transfer delay between the master radio base station and the slave radio base station, and
the slave radio base station sets the initial value of the timer on the slave radio base station side in consideration of a transfer delay between the master radio base station and the slave radio base station in addition to the elapsed time of the timer on the master radio base station.

2. A radio base station capable of operating as a master radio base station in a mobile communication system, in which a mobile station is configured to be able to perform carrier aggregation while using a cell under the master radio base station and a cell under a slave radio base station, and the master radio base station is configured to transfer a downlink data signal transmitted by a gateway device to any of the mobile station and the slave radio base station while the carrier aggregation is performed, the radio base station comprising:
a processor that starts a timer on the master radio base station side at a point when the downlink data signal is received from the gateway device while the carrier aggregation is performed; and
a transmitter that notifies the slave radio base station of elapsed time of the timer on the master radio base station side in conjunction with the transfer of the downlink data signal,
wherein the transmitter adjusts the elapsed time of the timer on the master radio base station side in consideration of a transfer delay between the master radio base station and the slave radio base station, and
wherein the slave radio base station sets the initial value of the timer on the slave radio base station side in consideration of a transfer delay between the master radio base station and the slave radio base station in addition to the elapsed time of the timer on the master radio base station.

3. A radio base station capable of operating as a slave radio base station in a mobile communication system, in which a mobile station performs carrier aggregation while using a cell under a master radio base station and a cell under the slave radio base station, and the master radio base station transfers a downlink data signal transmitted by a gateway device to the slave radio base station while the carrier aggregation is performed, the radio base station comprising:
a processor that, at a point when the downlink data signal is received from the master radio base station, start a timer on the slave radio base station side with an initial value set to elapsed time of a timer on the master radio base station side notified by the master radio base station, wherein the processor discards the downlink data signal transferred by the master radio base station at a point when the timer on the slave radio base station side expires, wherein the master radio base station adjusts the elapsed time of the timer on the master radio base station side in consideration of a transfer delay between the master radio base station and the slave radio base station, and wherein the processor sets the initial value of the timer on the slave radio base station side in consideration of a transfer delay between the master radio base station and the slave radio base station in addition to the elapsed time of the timer on the master radio base station.

\* \* \* \* \*